(12) United States Patent  
Kosheleff

(10) Patent No.: US 8,672,259 B2
(45) Date of Patent: Mar. 18, 2014

(54) COMPRESSION-LIFT AIRCRAFT

(76) Inventor: Patrick Andrew Kosheleff, Yankee Hill, CA (US)

(*) Notice: Subject to any disclaimer, the term of this patent is extended or adjusted under 35 U.S.C. 154(b) by 119 days.

(21) Appl. No.: 13/507,369

(22) Filed: Jun. 22, 2012

(65) Prior Publication Data

US 2013/0341459 A1 Dec. 26, 2013

(51) Int. Cl.
*B64C 1/00* (2006.01)

(52) U.S. Cl.
USPC .......................................... 244/36; 244/35 A

(58) Field of Classification Search
USPC .................................. 244/36, 35 A, 34 R, 200
See application file for complete search history.

(56) References Cited

U.S. PATENT DOCUMENTS

| | | | |
|---|---|---|---|
| 4,582,276 A * | 4/1986 | Gerhardt | 244/119 |
| 5,322,242 A * | 6/1994 | Tracy | 244/36 |
| 5,358,156 A * | 10/1994 | Rethorst | 244/15 |
| 5,538,201 A * | 7/1996 | Gerhardt | 244/204 |
| 7,546,977 B2 * | 6/2009 | Morgenstern | 244/35 A |
| 8,191,820 B1 * | 6/2012 | Westra et al. | 244/36 |
| 8,256,706 B1 * | 9/2012 | Smith et al. | 244/53 B |
| 2003/0205640 A1 * | 11/2003 | Bowcutt | 244/35 A |
| 2006/0038063 A1 * | 2/2006 | Graham et al. | 244/35 A |
| 2007/0187550 A1 * | 8/2007 | Elvin | 244/36 |

* cited by examiner

Primary Examiner — Christopher P Ellis

(57) ABSTRACT

A supersonic aircraft design using compression lift for enhanced cruise performance. Each engine nacelle at midspan has a vertical wedge at the nose which creates shock waves under the wings. The increased pressure behind the shock waves pushes up on the wings, creating compression lift. The second part of the process is trapping the shocks by some vertical surfaces. The inboard shocks are intercepted by a keel under the fuselage. This causes the reflected shock effect, which increases compression lift. The keel is just wide enough to store the main landing gear's wheel bogies one behind the other. One strut carrying a wheel bogie retracts upward and forward. The other strut retracts upward and backward. This allows tandem bogie storage in the narrow keel, which reduces drag. Outboard shocks are trapped by wingtip fins with pointed noses to reduce shock interference at the point of shock trapping.

7 Claims, 4 Drawing Sheets

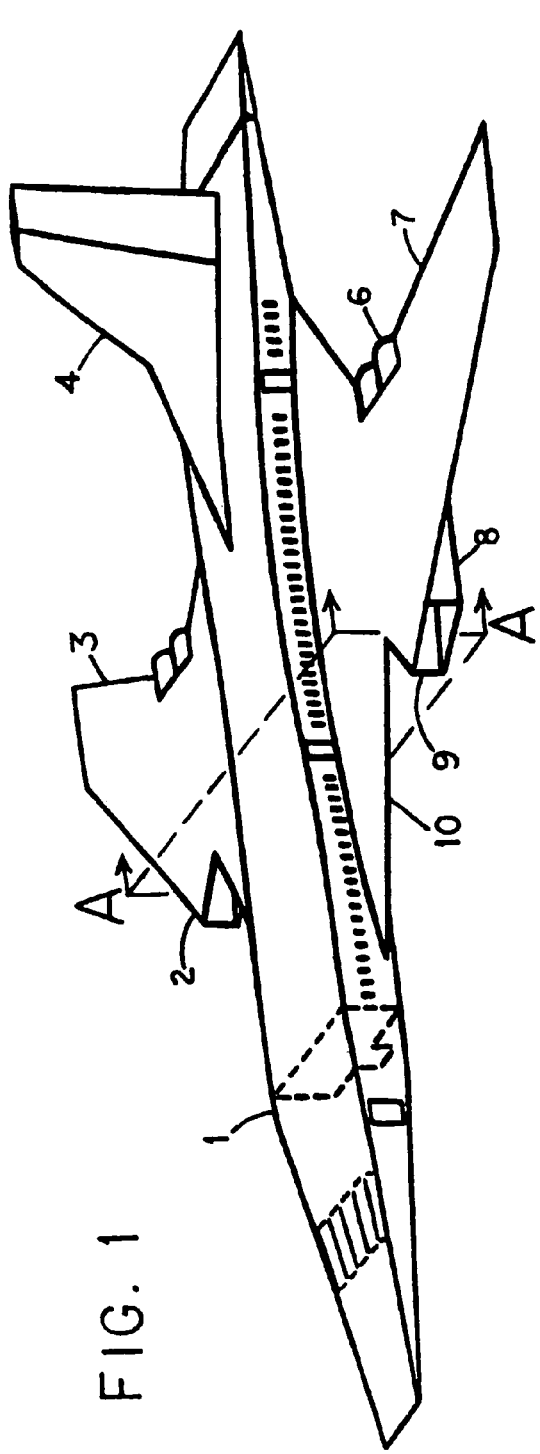
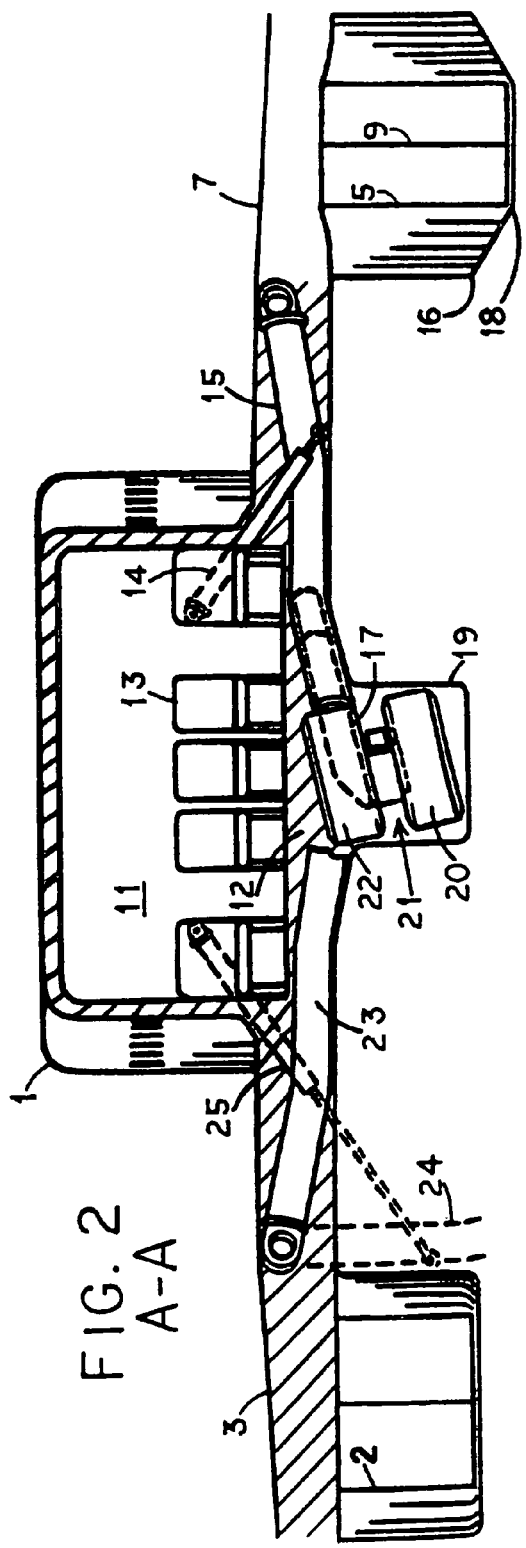
FIG. 1
FIG. 2 A-A

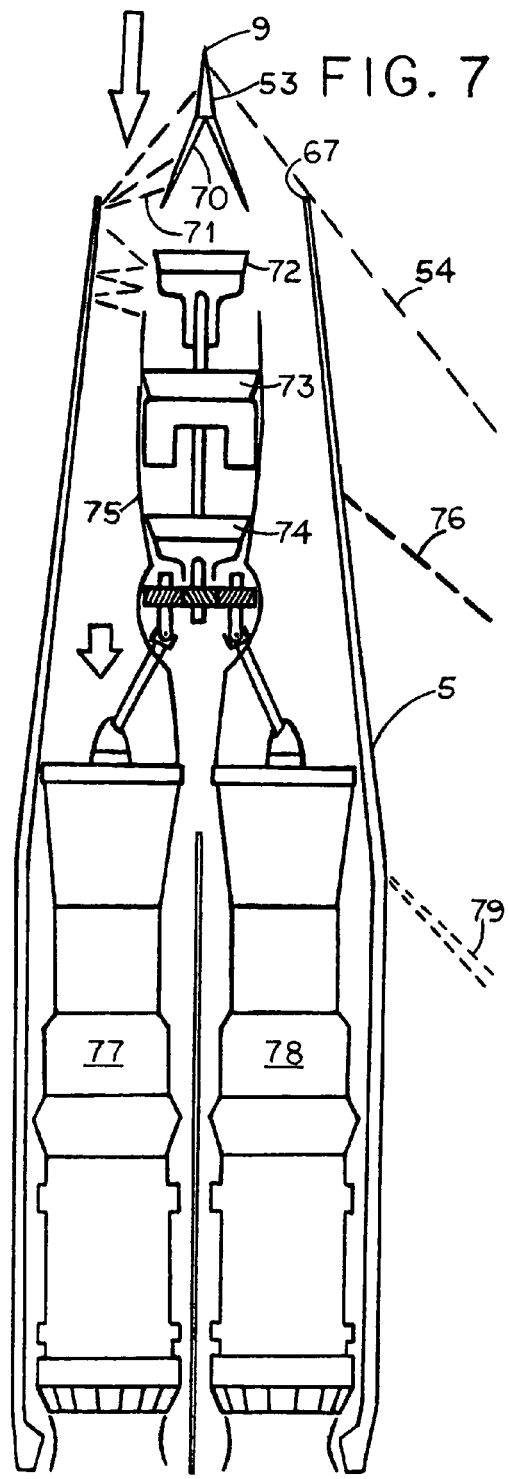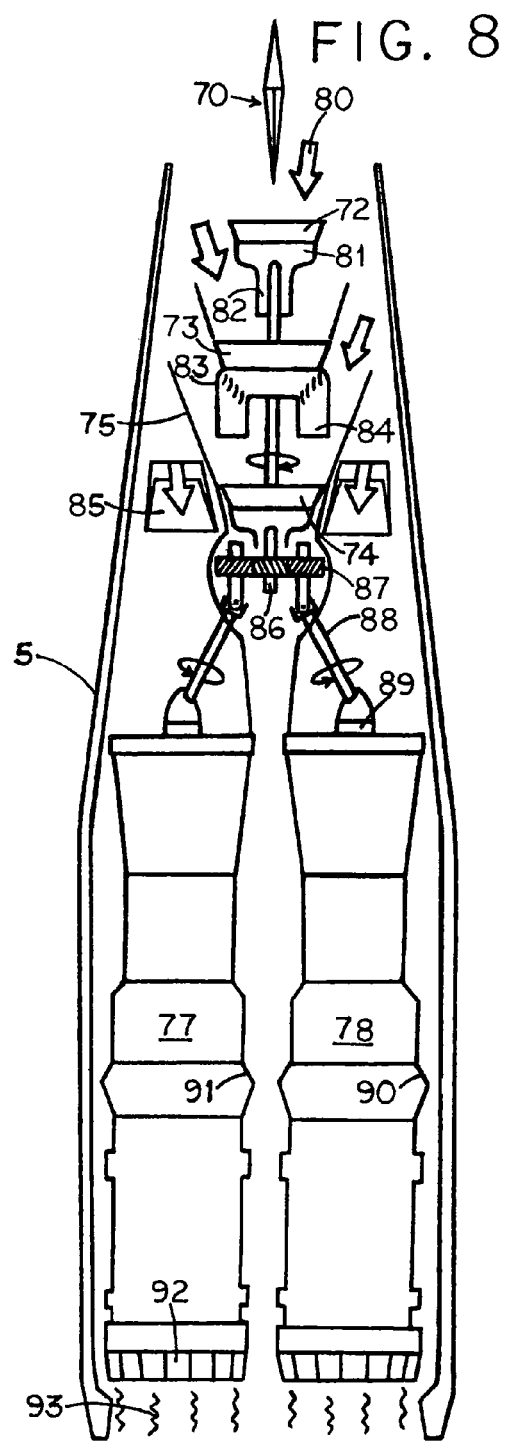

COMPRESSION-LIFT AIRCRAFT

BACKGROUND OF THE INVENTION

A supersonic aircraft design for cruising efficiently at Mach 2. Engine nacelles are placed under each wing near mid-span. A wedge nose at each nacelle creates oblique shock waves to the sides. The shocks spread horizontally under the wings. The greater pressure behind the shocks pushes up on the wings, creating the phenomenon known as compression lift.

Examples are found in U.S. Pat. No. 3,137,460 by the manufacturer of the XB-70 Mach 3 bomber. Most of the instances are for the XB-70's single, six engine nacelle under the fuselage. Although his FIG. 12 does show an individual engine nacelle under a wing, his conical nose spike 21 wastes half of the shock which spreads downward, away from the wing.

A similar observation can be made for the B-58 Mach 2 bomber (JANE's All the World's Aircraft, 1960-61, page 288.) It has individual nacelles hanging from a delta wing. The round nacelle noses create conical oblique shocks. A small part of a shock spreads under the wing where it creates compression lift, but most of the shock is wasted downward, or upward into thin air ahead of the wing.

The XB-70 Mach 3 bomber aircraft (JANE's, 1968-69, page 341; or 1964-65, page 268) was the first aircraft to achieve large amounts of compression lift. It established the need for a vertical wedge as the first surface of a supersonic air intake. The wedge creates a V-shaped shock wave whose sides trail back at an angle from the nose of the air intake. Being vertical, the wedge creates the oblique shocks horizontally. The shocks are positioned correctly to hug the bottom of the wing located just above the air intake. The pressure rise behind the shocks pushes up on the wings, causing compression lift. The invention aims to do the same, but with separate engine nacelles each housing only two engines. Engine accessibility for maintenance is much improved, important for airline use.

The Concorde Mach 2 airliner has one nacelle under each wing and each nacelle houses only two engines. However, in Concorde the wedge surfaces which create the shock waves are horizontal, not vertical as in ours or XB-70. Horizontal wedges throw the shock wave downward, away from the wing, so they do not generate compression lift.

The second part of compression lift is now addressed. This is trapping the oblique shock's. The XB-70 did it by folding its wingtips downward. They called it the reflected shock effect (FIG. 6 of Paper 650798, Society of Automotive Engineers ("SAE"), also in bound SAE Transactions, Vol. 74, 1966, page 604; Call Number TL1.S6.)

In the invention, the wingtips don't fold down. There are fixed tip fins which can intercept the outboard shocks. Tip fins are already known in the art. That leaves the inboard shocks. Inboard shocks exist because there are two widely separated engine nacelles. The invention uses a narrow keel below the fuselage to intercept the inboard shocks.

If no keel was there, the inboard shocks would just cross and escape under the rear of the aircraft. They would miss out on the reflected shock effect.

Keels in sailboats are thin plates which are cranked down from a centerboard. Our keel is thicker than that. It's wide enough to house the wheel bogies of the main landing gear. The bogies are stored one behind the other, which keeps the keel relatively slim. No example of tandem bogie storage was found in the U.S. Patent literature.

There is a supersonic bomber, The Tu-160, with the required vertical-wedge air intakes (Aviation Week & Space Technology (hereafter, "AWST") Aug. 24, 1992, page 65, the bottom photo.) The Tu-160SK space launch version (JANE'S, 1998-99, page 443) has a "centreline mount" for the Burlak rocket which is a keel of some kind. The keel is present in the photo of a model (AWST, Jun. 27, 1994, page 75.) The actual keel is seen in the small photo, AWST, Jun. 19, 1995, page 26. This "keel" appears to be a long, slender pylon of small depth, but which is capable of intercepting a little of the inboard oblique shocks caused by the nose wedges of the air intakes. Taking measurements on the large photo on that page 26, the keel is found to be 1.5 mm/8.0 mm=18.8 percent of the depth of the side of the engine nacelle. Thus, only about 19 percent of the depth of the shock's pressure field would be intercepted by this keel. The rest of the shock would pass below the keel and miss the reflected shock effect. Our keel is much deeper, about four feet which is the size of a wheel in the main landing gear. Of course, the Burlak rocket can intercept the whole shock—But then it's a composite aircraft.

SUMMARY OF THE INVENTION

A hi-speed, supersonic aircraft design using compression lift for enhanced performance during cruise at Mach 2. A narrow keel under the fuselage will capture some of the applicable shock waves. An engine nacelle containing two engines is placed under each wing near mid-span. Compression lift starts at the nose of a nacelle. A vertical wedge splits the intake airflow and creates an oblique shock wave trailing backward on each side of the nacelle. The shocks travel along the underside of the wings. The increased pressure behind the shocks pushes up on the wings, creating "compression lift."

The second component of compression lift is the reflected shock effect. To obtain it, it is known to place vertical surfaces in the path of the shock wave far downstream of the wedge. The oblique shock wave bounces off the vertical surface, causing a reflected shock. Additional compression lift is generated.

The invention contemplates placing a keel under the fuselage to intercept the inboard shocks. In other words, those shocks which come off the wedge on the fuselage side and travel toward the centerline of the aircraft. The keel will cause such a shock to reflect off a side wall of the keel, increasing the lift.

The keel is just wide enough to house the landing gear's wheel bogies one behind the other. One strut carrying a wheel bogie retracts upward and forward, the other strut retracts upward and backward. This tandem bogie storage makes for a slender keel, compared to the usual bulky hold volume under the passenger cabin.

The keel obtains drag reduction by virtue of being narrow. Narrowness has another use: The slender keel in combination with a wide-body fuselage. Then there is more fuselage bottom area for the shock pressure to push upward on, increasing lift.

Tip fins near the wingtips intercept the outboard half of the shock generated by a wedge. This achieves the reflected shock effect at the outer part of a wing. The tip fins have noses shaped like triangles with an acute angle. This high sweepback reduces the shock wave created by the fin itself. That causes less shock interference at the place on the fin where the wedge shock is reflected.

Engine nacelles are placed with their noses ahead of the wings's leading edge. In this known maneuver, the wedges encounter undisturbed intake air. A side effect is that the nacelles are longer than usual. Up to three fans can be fitted in the vacant volume between the nacelle's oppositely curved airflow passages. The fans, driven through angled driveshafts from the engines's front rotor at takeoff, double the air mass flow for reduced exhaust noise.

BRIEF DESCRIPTION OF THE VIEWS

FIG. 1 is an oblique elevation from the side of the aircraft.

FIG. 2 is a transverse cross section of the aircraft at amidships.

FIG. 3 is a plan transparent view of the wing showing the retracted main landing gear, and the keel with tandem bogie storage.

FIG. 4 is an elevation of means to align a wheel bogie for landing.

FIG. 7 is a plan view of a nacelle's contents during cruise flight.

FIG. 8 is a plan view of a nacelle's contents during takeoff.

DETAILED DESCRIPTION

Figures 5, 6:
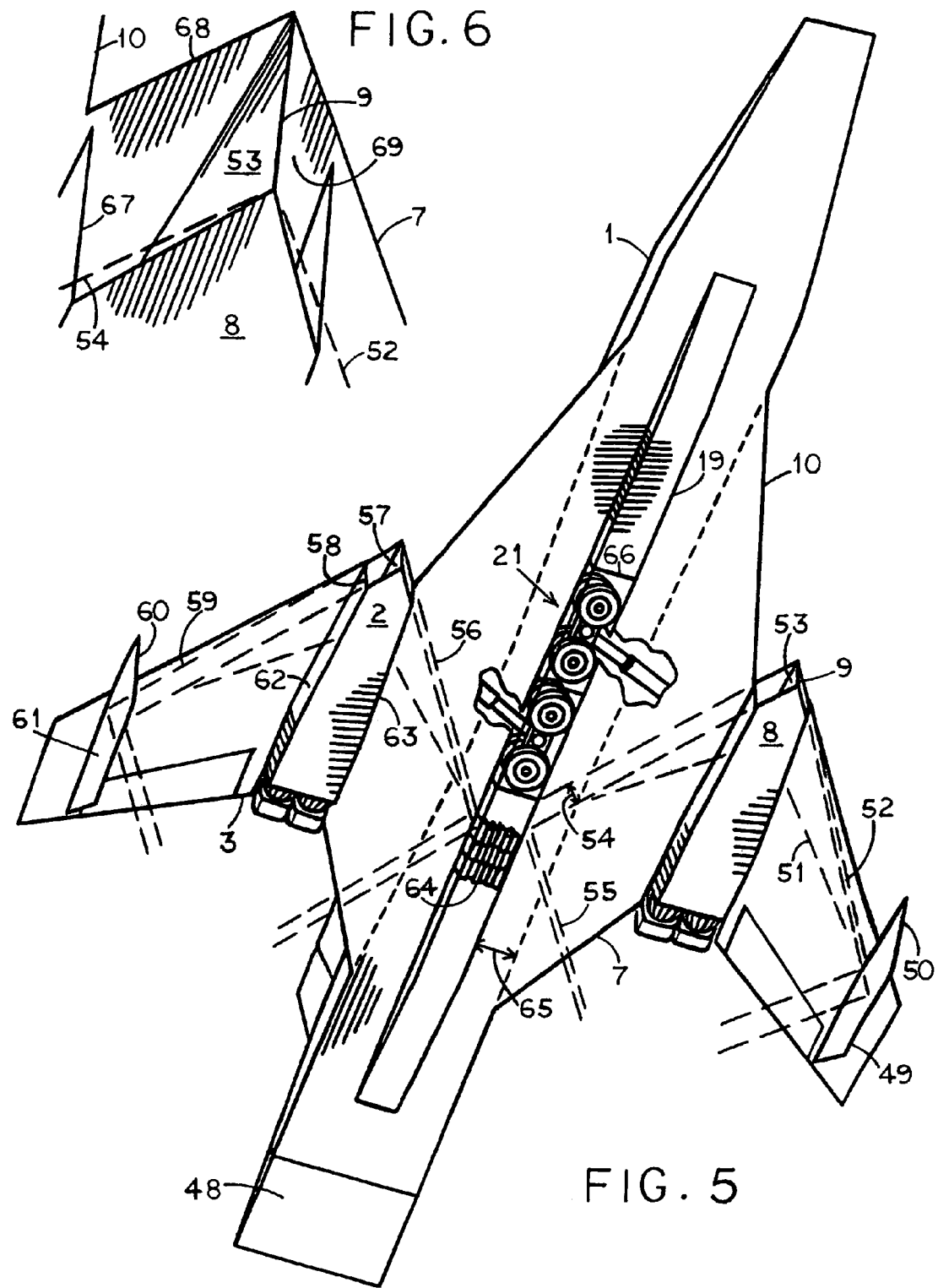
FIG. 5 is an underside plan view of the shock wave system.
FIG. 6 is a ¾ underside view of the nose of an engine nacelle.

FIG. 1 shows an airliner design intended to cruise efficiently at Mach 2. There is a fuselage 1, wings 3 and 7, and a vertical tail 4 for directional stability. It takes a lot of power to fly at Mach 2 so there are four large turbojet engines such as 6 housed two to an engine nacelle 8. Knife-edge 9 at the front of a nacelle 8 splits the intake air into halves, one of them going to feed engine 6. A similar nacelle 2 is found under other wing 3.

There has already been a Mach 2 airliner, the Concorde which was in airline service for two decades. The layout of our aircraft design is similar except that Concorde's long-chord delta wings have been replaced by swept-back ones 3 and 7. At the right, the end of fuselage 1 is configured as an elevator, whose leverage is maximum for its control. Fuselage 1 narrows at cutting plane A-A, an application of area-ruling which offsets some of the wave drag caused by the bulge of wing root 10. Area-ruling is a known technique which won't be further discussed.

An aircraft's range depends on its aerodynamic lift/drag ratio. Increasing the lift for a certain drag, or reducing the drag for a certain lift, are both improvements which this document aims to achieve. Drag reduction can be seen in FIG. 2.

FIG. 2 is a transverse cross section of FIG. 1 at cutting plane A-A. As before, there is a fuselage 1 and the two wings 3 and 7. There is a passenger cabin 11 with generic cabin floor 12 and containing passenger seats 13 et al. The flatness of fuselage 1 could reduce drag by eliminating some unneeded passenger headroom. Wings 3 and 7, considered as volumetric entities, adjoin the bottom means of fuselage 1. The wings might bolt to the fuselage, or have some structure blending or merging continuously into the fuselage's structure. There is a keel 19 which is a replacement for the usual voluminous hold under the passenger cabin.

Figures 3, 4:
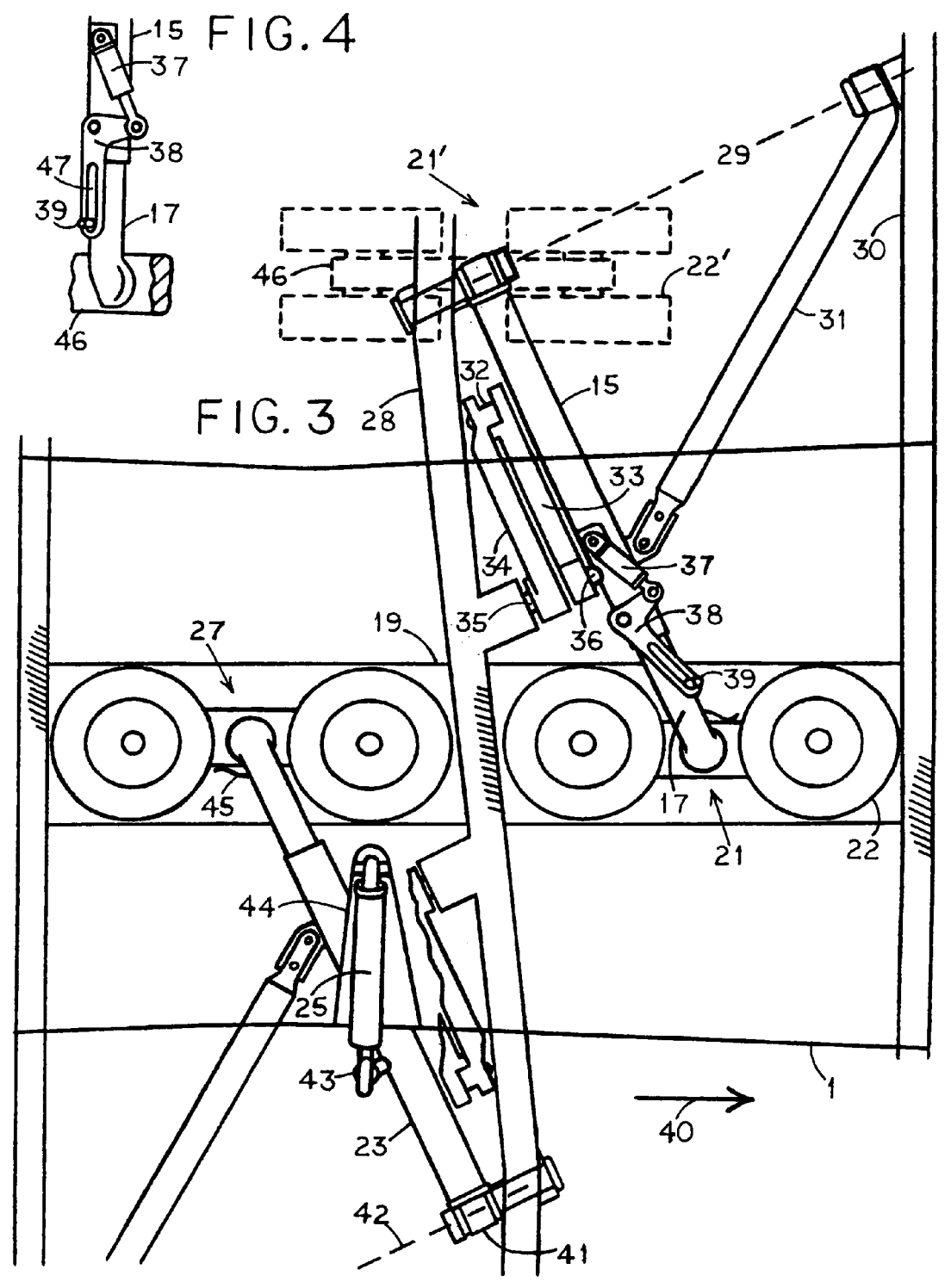

In other aircraft, the hold is used to store the main landing gear wheel bogies side-by-side. This requires substantial width. In our modification, relatively narrow keel 19 is only wide enough to house one wheel bogie 21. The other wheel bogie goes behind it, to be seen in FIG. 3. This storage of wheel bogies in tandem keeps keel 19 relatively slender, which reduces aerodynamic drag. That is the first improvement.

Concorde seating was 4-abreast. In our co-pending U.S. application Ser. No. 12/931,409, the keel's lower drag was offset by widening fuselage 1, also shown here, to contain more passenger seats than Concorde. Operating cost per seat-mile would drop. FIG. 2 shows 5-abreast seating in the narrowest part of fuselage 1. Visually, there is room for two more seats in the wider parts. Seven-abreast or more seating is defined to be a wide-body supersonic aircraft.

Similar to the material in U.S. application Ser. No. 12/931,409, the main landing gear includes two struts 15 and 23. Focussing on only one side, there is a lower strut 17 which can slide upward in strut 15 to absorb landing impact. Strut 15 and lower strut 17 together are sometimes referred to as "strut". The strut carries a wheel bogie 21 which includes wheels 20, 22, and two others behind them. Wheel bogie 21 fits mostly in keel 19 but may also take up some room in cabin floor 12, as shown.

Strut 15, 17 and its bogie 21 are in the retracted position, pulled up by the piston rod of hydraulic cylinder 14. The other strut 23 is also shown retracted. For landing, strut 23 will be pushed downward to position 24 (dashed lines) by the piston rod of hydraulic cylinder 25. Engine nacelle 2 is just outboard of down strut 24. Similarly for nacelle 5 and strut 15 when extended. As shown, struts 15 and 23 when retracted lie mostly flat in wings 7, 3 and cabin floor 12. Floor means 12 will need to have hollow places to house the upper part of wheels like 22. Long and narrow indentations in cabin floor 12 would make room for long and narrow struts 15 and 23.

FIG. 3 is an overhead view of struts 15 and 23 in their retracted positions. Wheel bogies 21 and 27 are stored in tandem, one behind the other, within keel 19. In this view from above the aircraft, cabin 11 from FIG. 2 has been removed, including its roof, generic cabin floor 12, and seats 13 et al, leaving only the exterior outlines of fuselage 1 and keel 19 in FIG. 3. During retraction, strut 15 previously vertical pivoted and brought wheel bogie 21 upward un-until it lodged in keel 19. The important point is that strut 15 angled forward as it moved upward. That is because pivot axis 29 makes a considerable angle to the aircraft's length, or forward direction 40. An opposite angle for strut 23's pivot axis 42 made strut 23 angle backward during retraction. Hydraulic cylinder 25, held at its upper end by hollow bulkhead 44, pulled on balljoint stud 43 to retract strut 23. Leaf spring 45 pushed on the beam of bogie 27, making it dip so that it aligns with keel 19.

Pivot axes 29 and 42 pass through main spar 28 which supports strut pivot sleeves 41. Spar 30 supports the pivot for drag brace 31. A side brace has two links 33, 34 which turned on their pivots 35 and 36 to fold side-by-side and flat, as shown. Drag brace 31 is less complicated. Drag brace 31 has the same pivot axis 29 as strut 15, and makes a single assembly with it. They move as a unit.

The topic now changes to the landing gear when extended for landing. Although a separate. Figure is not provided, enough can be understood from FIG. 3. The first action is that strut 15 and drag brace 31 will turn as one, ninety degrees downward around their common axis 29. Bogie 21 should end up pointing straight ahead as bogie 21', seen from overhead. This crucial point will be re-visited shortly. Side brace 33-34 will unfold on its pivots 35, 36 and straighten out (not shown, but a common maneuver.) Ledge 32 will meet a similar ledge on the other side of link 33 to stop the unfolding of the side brace when it reaches straightness, also well known.

With the gear down and locked, the big problem is caused by bogie 21 which started out co-planar with strut 15 and drag brace 31. With the gear down, bogie 21 would end up pointing in the direction of axis 29, which is useless for landing. The desired bogie orientation is straight ahead. That is pictured as bogie 21'. To achieve it, lower strut 17 must be made to turn. This will "steer" bogie 21 to the correct heading 21' as the landing gear is lowered.

FIG. 4 shows the mechanism. It starts with hydraulic cylinder 37. Cylinder 37 has extended its piston rod so that bell crank 38 has turned clockwise about its pivot. The lower arm of bell crank 38 is now vertical, as is its slot 47. Pin 39 has been made to turn right from its orientation in FIG. 3. As a result, in FIG. 4, lower strut 17 on which pin 39 is mounted has also turned. Beam 46 of the bogie has turned too, giving it the new heading 21' seen at the right in FIG. 3, and the aircraft can land.

In FIG. 4, as a second necessity, slot 47 is now vertical so that pin 39 can ride up as lower strut 17 compresses into strut 15 to absorb landing impact. To assure slot 47 being vertical, bell crank 38 would encounter a limit stop (not shown, but probably a pin stuck into strut 15.)

Returning to landing gear retraction in FIG. 3, the same mechanism "steered" bogie 21 so it could lodge in keel 19 cleanly. Hydraulic cylinder 37 retracted its piston rod, bell crank 38 turned counterclockwise, pushing pin 39 and making lower strut 17 turn left. If it had not done so, wheel 22' still pointing straight ahead after takeoff would be much too high when it entered keel 19 from below. It would hit the cabin floor before bogie 21 was fully housed in keel 19. But now the bogie is flat, as desired. Keel 19 can be relatively shallow, for less drag, as seen in FIG. 2. Bogie 21's tilt from this new angle doesn't add much depth to keel 19.

This concludes the description of the landing gear and its retraction in a narrow keel. Later, another use for keel 19 will be found.

The second improvement contemplated by the invention is to increase the lift without increasing the drag. A phenomenon known as "compression lift" during supersonic cruise is invoked. It takes advantage of certain shock waves created by nacelles 2 and 5 at Mach 2. Briefly, any supersonic aircraft with engine nacelles which are not buried can produce some compression lift. That includes Concorde, plus the B-1 and the Russian Tu-160 swing-wing bombers. The XB-70 is the only one which systematically captured all the shock waves. There was a vertical nose wedge, an engine nacelle with flared sides, and wingtips which fold downward toward the vertical. We plan to replicate those features. The invention departs from XB-70 by having two engine nacelles instead of just one. Engine accessibility is much improved. On the other hand, some of what XB-70 did has to be accomplished in a different way. Keel 19 has a role to play in this. But this is getting ahead of the story.

Aircraft Performance

In U.S. application Ser. No. 12/931,409 the idea was presented that tandem wheel bogie storage in a narrow keel replacing the usual voluminous hold under the passenger cabin, would allow widening the cabin to carry 75% more passengers than Concorde without a drag penalty. Unfortunately, it didn't make it. There was more drag, and calculations showed that, starting from a Concorde baseline of 4,000 miles range and Mach 2.02 cruise, our range would fall to 3,734 miles and cruise speed to Mach 1.867.

One design remedy adopted was known to the manufacturers of Concorde as the "B" wing proposal. It is briefly described in SAE Paper 800732, also in bound SAE Transactions, 89:2276 (1980.) The "B" wing resembles wing 7 in our FIG. 1 somewhat. Stated differently, if nacelle 8 was removed and the outboard part of wing 7 was pushed inward against wing root 10, the resulting wing planform would approximate the shape of the "B" wing. In other words, a cranked leading edge and more wing span than Concorde.

The "B" wing raises the lift/drag ratio from 7.3 to 7.8 at Mach 2 (page 3 of SAE Paper 892237.) That is a 6.85% improvement. Range would increase from our 3,734 statute miles to (3734)(1.0685)=3990 miles—Practically the same as Concorde's 4000 miles. With the lesser drag, cruise speed would be back up to Mach 1.995, also acceptable. Thus, what would be expected so far (before compression lift) is to approximate Concorde's performance but to carry 175 passengers instead of 100.

Aircraft Use

What use is a new supersonic airliner? For one thing, trans-Pacific routes to countries starting to emerge as large markets. Taking the example of India, the first leg of a twice-refueled flight to New Delhi might start from Seattle and follow a great circle route until Kushiro, the first city in eastern Japan which shows on a globe. Modifying the great circle route slightly to dip 25 miles south of the Aleutians, to spare the inhabitants the sonic boom, this leg is 4,365 miles. It would cut 43 percent into Concorde's (or ours) reserve fuel which is 9% of gross weight (FIG. 6, SAE Paper 751056, also in bound SAE Transactions, 84:2945 (1975)). 43 percent is unacceptable, but a solution is available. Our range on block fuel must go up by 4,365/3,990−1=10.94 percent. Lift-to-drag ratio improvement by 10.94% is implied. Compression lift can give it.

Compression lift was discovered by NASA and adapted to the XB-70 Mach 3 bomber (JANE's, 1968-69, pages 341-2.) A brief technical discussion which is easy to follow is in pages 2-3 of SAE Paper 650798, also in bound SAE Transactions, 74:604 (1966). The main feature is that the supersonic air intake which feeds the engines starts with a fixed wedge which creates oblique shock waves. At these high speeds, the shock waves bend back at a sharp angle of 65 degrees. The geometry of these angled shocks fits well under the swept-back shape of the XB-70's delta wing. Then the increased pressure behind the shocks pushes up on the wing, giving added lift.

Such compression lift is largely free because a shock wave is always present at the nose of a supersonic air intake. The best shape of the engine nacelle's nose to generate the shock wave is the sharp vertical wedge seen in the XB-70. A good view is the bottom picture of page 341, JANE's 1968-69. Another example is wedge 11 and ramps 12, FIGS. 1 and 2 of U.S. Pat. No. 3,137,460 by the manufacturer of XB-70. Then the shock waves form a horizontal "V" trailing backward at a sharp angle from the nose wedge.

Our version of that is FIG. 5 showing the aircraft's underside. The main difference from XB-70 is two engine nacelles 2 and 8 instead of a single, central nacelle. The hardware is similar: Nose wedge 53 has a vertical knife-edge 9. The shock will bend back symmetrically to the sides, creating oblique shocks 52 and 54. The greater pressure behind shocks 52 and 54 pushes up on wing 7, increasing the lift/drag ratio as in FIG. 4 of SAE Paper 650798. This will extend the range of our aircraft.

Our shock waves at Mach 2 will be weaker than XB-70 at Mach 3 but the amount of improvement in lift/drag ratio can be estimated. The first step uses the second graph in FIG. 4 of SAE Paper 650798. Comparing the solid line to the dashed line, the highest lift/drag ratio with compression lift is 1.228 times that without it. Our aircraft at Mach 2 would be less favorable than XB-70 at Mach 3. The difference is found in graphs for oblique shocks in a textbook on fluid dynamics, "COMPRESSIBLE FLUID FLOW", A. H. Shapiro, Ronald Press, 1953, pages 536-538. The wedge angle in XB-70 is needed first. SAE Paper 650798 writes that their shock is bent back about 65 degrees from normal. Then the shock angle is 90°−65°=25°. Using FIG. 16.4 of the textbook, at 25° and Mach 3.0, the deflection angle is 7.5 degrees. That's the angle of one side of the wedge. Using. FIG. 16.6 (a), at a deflection angle of 7.5°, the pressure ratio behind the shock is 1.73 at Mach 3.0, and 1.50 at Mach 2.0. A pressure ratio of 1.0 is no compression, so only the decimal digits matter. The lift/drag ratio increase developped by our shocks 52 and 54 would be (0.50/0.73)(22.8 percent)=15.6 percent. Our range would go up to (1.156)(3990 miles)=4,612 miles, enough to reach Kushiro, the first refueling stop, with plenty to spare.

One complication is that the sides of XB-70's nacelle flare outward slightly, creating their "wedge fuselage" (second drawing, FIG. 3 of SAE Paper 650798.) The drawing shows a second shock being created, which adds to compression lift. This flared nacelle follows their own dictum, "a supersonic inlet must be narrow at the front and expanded aft to the size of the engine envelope." Therefore, our nacelle sides 62, 63 duly flare along over half their length, similar to XB-70's nacelle. Such flaring creates the second type of oblique shock 51. But our flare cannot be as much as XB-70's: The inlet air approaches our nacelle at Mach 2, not Mach 3. There has to be a bigger opening at the front to pass the same amount of air. Then the sides of our nacelle must make a shallower angle than the sides of XB-70's nacelle, which is 5° by measurement. Its nose wedge angle was computed earlier at 7.5 degrees. Thus, the breakdown of XB-70's compression lift is 7.5:5, or 60% by the nose wedge and 40% by the wedge nacelle (their so-called "wedge fuselage".) In our case, the second part would be less. Because of our larger inlet opening, the nacelle sides angle is, by measurement of sides 62 and 63, 4 degrees. That is 80% of XB-70's nacelle sides angle of 5 degrees.

Our lift/drag ratio improvement should be about: (0.60+(0.80)(0.40)) of XB-70's, or (0.60+0.32)(15.6 percent) =14.35 percent.

From an earlier calculation, only 10.94 percent improvement would give a range of 4,365 miles, enough to reach the first refueling stop. If the whole 14.35 percent was realized, then range would go up to (1.1435)(3990 miles)=4,563 miles, which might open up some new possibilities.

Aircraft Use II

After refueling near the city of Kushiro (population 205,000) close to the eastern tip of the island of Hokkaido, Japan, the aircraft takes off on a second supersonic leg. A great circle route toward Southeast Asia would put it over Japan. Instead, turning 20 degrees left and flying 600 miles over open ocean misses the coast near Tokyo by 25 miles. Turning right 20 degrees and flying 3,000 miles of a great circle route over open ocean takes the plane between Taiwan and the island of Luzon in the Philippines, ending up 25 miles South of the southern tip of Vietnam. A 70 degree right turn, still supersonic, then 470 miles takes it to Thailand's narrow peninsula. Subsonic descent, landing at the international resort of Phuket for the second refueling, concludes the second leg, of 4,148 miles. The third and last leg starts supersonic and to the northwest, passing between the Andaman Islands and Myanmar (formerly Burma), a distance of 1,213 miles to Calcutta. Slowing down to subsonic for the last 800 overland miles to New Delhi.

Total flight time at Mach 2 is 7.33 hours, and subsonic is 1.41 hours. Two refueling stops including climb and descent are estimated at two hours, for a grand total of 10.74 hours to cover the 10,520-mile trip from Seattle to India's capital. This eleven-hour flight might be within the limit of the passengers's ability to arrive sufficiently fresh to meet the expectant gazes of potential business partners at New Delhi's airport.

For different destinations, a great circle route from San Francisco to Wake Island is 4,465 miles. This is only 2.3% over the proposed 4,365-mile range with lift/drag improved 10.94% by compression lift. Probably still acceptable. From Wake Island to Melbourne, Australia or Wellington, New Zealand, is 4,380 miles, only 15 miles of it using reserve fuel. The total of 8,845 miles at Mach 2 takes 6.7 hours. Adding one hour for descent, refueling and climb at Wake Island gives a total of 7.7 hours for the trip.

An alternative route for New Delhi would start with the San Francisco-Wake Island leg of 4,465 miles. The second leg would be almost due West to Manila, 3,065 miles away, for the second refueling stop. The last leg to New Delhi is about 3,700 miles, for a total of 11,230 miles and an approximately 11½ hour trip.

Shock Waves and the Keel

So far, compression lift is unrelated to the invention because it is potentially available to any supersonic aircraft. However, the next feature does involve the invention. The relevant text is page 3 of SAE Paper 650798: The folding wingtip concept. XB-70's wingtips fold downward, trapping the shock under the wings. SAE Paper 650798 calls it the reflected shock effect. The further increase in lift/drag is seen in their FIG. 6. We plan a similar thing.

In FIG. 5, wheel bogies 21 et al are stored in tandem in keel 19. Doors such as 66 would open to admit the bogies. But keel 19 has another function. Keel 19 intercepts oblique shock 54. Continuation shock 55 rebounds like a light ray reflecting off a mirror (textbook, pages 554-5.) There is a pressure increase like in FIG. 6 of SAE Paper 650798. This is what they called the reflected shock effect. Keel 19 has duplicated the function of XB-70's folding wingtips. Keel 19 trapped shock wave 54 heading for the aircraft's centerline.

Fuselage bottom strip 65 adds its area to the area of wing 7's lower surface to create a relatively large expanse for shock 54's pressure rise to push up on. The narrower keel 19 is, the greater that expanse can be. Similarly, a wide-body fuselage has a naturally greater fuselage bottom means than a narrow-body one. The gain in area signifies a gain in compression lift.

Keel 19 also traps oblique shock 56 issuing from second nacelle 2. If keel 19 wasn't there, shocks 54 and 56 would just cross and extend out the back without benefitting from the reflected shock effect. For completeness, the outboard oblique shocks 52 and 59 are trapped by wingtip fins 49 and 61. This last item finishes the effort to largely duplicate the oblique shock generation and trapping in XB-70 seen in FIGS. 2-6 of SAE Paper 650798.

The high-sweepback leading edges of XB-70's folding wingtips are herein duplicated. Wingtip fins's leading edges 50 and 60 have their acute angle meeting the airstream. An enhancement is that leading edges 50 and 60 project ahead of wings 7 and 3. Before shock 52 reflects off the broad part of wingtip fin 49, leading edge 50 has already had time to penetrate the airflow. High sweepback reduces the strength of the shock (not shown) caused by the fin itself. There will be less shock interference with shock 52 at fin 49.

Inlet Design

The aircraft is a hybrid of Concorde (with two engine nacelles) and XB-70 (with maximum compression lift.)

Some things need to be checked. Supersonic inlet design is one. At the start, it follows the model of the Mach 2.0 Concorde's inlet. Its entire flow path is approximately seen as the left side of our FIG. 7, to be discussed later. In FIG. 5, fixed wedge 53 corresponds to Concorde's "first compression surface" (page 260 of Journal of Engineering for Power, April 1979, 101:259.) Its wedge angle is 7 degrees. Ours was chosen earlier at 7.5° to allow a comparison of pressure rise to XB-70's wedge angle of 7.5°. In Concorde the second compression surface is an adjustable ramp (70 in our FIG. 7.) It turns the airflow another 5.75°, focussing "just outside the intake capture stream tube at cruise Mach number" (page 260 also.) What is focussed is the shock waves. " . . . there is a tradeoff between increased spillage and rising recovery as the front ramp angle is increased . . . " (page 260.) "Recovery" is the fraction of dynamic pressure successfully converted to static pressure. "Spillage" in Concorde was only about 1% (bottom text of their page 264.)

The "spillage" corresponds to the desired shock waves 54 and 59 seen in our FIG. 5. They were created by wedges 53 and 57. This follows the model of XB-70 seen in FIGS. 3 and 4 of SAE Paper 650798. Their drawings show the "inlet wedge shock" starting from the very tip of the wedge. However, the shock grazes the side wall of their "wedge fuselage" (their engine nacelle.) We show the same thing as shock 59 grazing front edge 58 of side wall 62. What happens at the grazing is unknown. We just follow the model, so far.

Wing Areas and Wedge Angles

A comparison is made of the wing's lower surface area which will benefit from compression lift. There is a revealing view from below of XB-70 in flight (page 268 of JANE's, 1964-65.) The dark line just above the USAF star logo shows the hinge line for the folding wingtip. When the wingtip is folded down, the area between the dark line and the central nacelle will produce compression lift. In our FIG. 5, the corresponding area is all the metal surface behind shock waves 56 and 59. These areas seem about the same.

The shock waves from XB-70's intake wedge at Mach 3.0 was swept back 65° from normal. Their delta wing had about the same sweepback. Our geometry is somewhat different. We do start with the same initial wedge half-angle of 7.5°, but at Mach 2.0 the sweepback angle is less, 54°. From FIG. 16.4 of the compressible flow textbook, at Mach 2 and 7.5° deflection angle, the shock angle is 37°. Then, 90°−37°=53°, the sweepback angle. The outboard portions of wings 3 and 7 in FIG. 5 are drawn with about that angle.

Airflow Details

In FIG. 6, wing leading edge 10 was swept back sharply so that it only joins nacelle 8 at the side. The shock wave created by leading edge 10 should miss the inlet of nacelle 8. The intake airflow entering between nacelle side wall 67 and wedge 53 should be undisturbed.

Throughout, it's good to remember that there is another wedge like 53, but unseen, on the other side of knife-edge 9. It will have the same wedge half-angle of 7.5° as wedge 53. It is what creates shock wave 52 of FIG. 5. The same thing applies to nacelle 2 where an unseen wedge on the other side of wedge 57 creates shock wave 56. As a matter of definition, then, "wedge" usually meant "half-wedge."

In FIG. 5, leading edge 10 extends so far forward that it reminds of the "strake" in the Navy's F/A-18. But here it has the useful role of creating a volume possibly for fuel tanks. Keel 19 is largely filled by wheel bogies 21 et al and passenger luggage 64. There will also be a nose landing gear.

Nacelle 2's position in wing 3 is similar to drawing #2, page 43 of Mechanical Engineering, November 1962. Their "double engine pods" have the nose wedge like ours. The wing root's leading edge is sharply sweptback like our 10. The only difference is their wing's outboard portion's leading edge is pulled backward significantly. That was avoided in our wing 3. Otherwise, shock 59 would dissipate upward into thin air.

FIG. 6 handles the case of increased spillage at the inlet. More airflow can spill past nacelle side wall 67 because there is a bigger gap than in Concorde. Increased spill flow replenishes the cushion of higher pressure air behind shock 54 faster. Faster than when shock 54 grazes the tip of nacelle side wall 67, that is, as seen in FIG. 7. Returning to. FIGS. 6 and 5, that should delay the dissipation of the pressure field under a wing. More compression lift could be obtained. Cruising altitude might be increased, where there is less drag.

In FIG. 6, shock 54 extends upward (not shown) to line 68, but to avoid drawing clutter, line 68 is drawn only as a leading edge. To achieve spillage, what shock 54 does depends on the position of nacelle side wall 67. If it was farther forward, then shock 54 would be completely contained within the nacelle's opening. There would be no compression lift. In the position of side wall 67 shown, however, air behind shock 54 spills out to the left over side wall 67. The spillage is desired to be much more than the 1% cited earlier for Concorde's inlet. Line 68 represents a lip angled like shock line 54 but which will cover the upper edge of the shock. It keeps the shock from dissipating upward into thin air.

Keel Dimensions

In FIG. 2, keel 19 and nacelle 2 were drawn as roughly the same height because the size of the components they house is the same. From JANE's, 1978-79, page 83, main wheel tire size is 47 (inches), and from page 695, the diameter at the front face of the Olympus engines in Concorde is 47.5 inches; nacelle height would depend on the diameter of the engine. Concerning the height of keel 19, the width of twinned-wheel bogie 21 is about the same as the height of a tire.

Keel 19 and nacelle 8 of comparable heights in FIG. 5 would trap the whole height of shock 54 in FIG. 5. The apparent shallowness of keel 19 in FIG. 5 compared to nacelle 8 is an intentional illusion. Nacelle 8 is drawn more tilted than keel 19 to emphasize the width of shock wave 54.

The Effect of Mach 2 instead of Mach 3

The air behind a shock wave always moves slower than ahead of it. That leads to interesting physics in the case of compression lift. The situation is viewed by an observer moving with the aircraft. The shock is fixed and the air streams through it. The air after the shock is at somewhat higher pressure. The Continuity Equation applies, (density)(area)(velocity)=constant. The area is ignored in continuity through a shock (textbook, Equation 16.1). Density is higher because the pressure is greater. Then, by the equation, the air velocity relative to the aircraft must decrease.

That trailing air therefore picks up some of the aircraft's speed and moves with the aircraft for a little while. That explains the presence of the air "cushion" at higher pressure under the wing. The persistence of that cushion depends on the fact that the aircraft travels faster than the air molecules can escape downward from the cushion. The molecules move at the speed of sound. The aircraft moves at twice the speed of sound. The air cushion is constantly being replenished. Of course, the "leakage" area (the undersurface of the wing) is much greater than the inflow area (the shock, which is only wedge high.) An equilibrium pressure rise is reached, which was 40 lbs/sq ft in SAE Paper 650798. That's 0.28 lbs/sq in.

The only example of compression lift is the XB-70 which cruised at Mach 3, not Mach 2. It seems likely that our air cushion will be weaker from not being replenished as fast. As a result, the simple calculation based only on shock strength done earlier may overstate the compression lift at Mach 2. Means to increase it are needed.

One solution is to force more compression lift by increasing the wedge angle, and the taper angle of the engine nacelles. The first is doable: Concorde engineers considered it, as increasing the ramp angle, in the earlier-cited page 260 reference.

Nacelle Modification

Nacelle 8 from FIG. 5 will now be re-proportioned to make stronger shock waves. The model is FIG. 7 skews alternative nacelle 5 which has a more pronounced lengthwise taper on its side walls. In FIG. 2's nacelle 5, the main change is a narrower air inlet opening than in nacelle 2. It is seen that nacelle side wall at numeral 5 is higher than nacelle side wall at numeral 2; then, for the same air inlet area, the opening at 5 is narrower than the opening at 2. The total air intake is the sum of the two smaller ones flanking knife-edge 9. The twinned, total air intake bracketing knife-edge 9 is a rectangle stood on its end, while the twinned, total air intake at nacelle 2 is a rectangle lying on its side.

As a result, in FIG. 7 nacelle 5's side wall tapers relatively sharply to the narrow opening at leading edge 67. The earlier-measured taper of 4 degrees on side walls 62 and 63 of FIG. 5 now doubles to the 8° in nacelle 5 of FIG. 7. That increases the strength of nacelle shock 76 corresponding to shock 51 in FIG. 5. The statement about recovery increasing with wedge angle from the previously cited p. 260 applies: More recovery means higher pressure.

In FIG. 2, a matter of concern is the fact that nacelle 5's floor now rises toward the rear. In other words, point 16 is higher than point 18. If that condition existed during cruise flight, the nacelle floor would create negative lift. Fortunately, the wing's angle of attack in flight is about 2° (SAE Paper 660274.) It cancels the nacelle floor's angle. It will fly flat to the slipstream.

If everything works as expected, the pressure rise behind the shocks will be greater, but the air cushion beneath the wings will "leak" faster. As mentioned earlier, that's because the cushion is replenished less rapidly at Mach 2 than at Mach 3. The desired end result is that the two effects will offset, and the net compression lift equals the 11-14 percent from the overly-simple calculation.

Stronger shocks would cost some engine power. It could come from more efficient turbojets than the ones designed for Concorde in the 1960s. But a large improvement is unlikely.

On the other hand, dragging the air cushion behind the shocks by the aircraft incurs less loss at Mach 2 than at Mach 3. The graph in FIG. 16.5 of the textbook gives exit Mach No. versus inlet Mach No. and turning angle. For a turning angle of 7.5° (the wedge angle so far), the exit Mach No. at Mach 2 is 1.73; at Mach 3, it's 2.63. The speed of air dragging behind a Mach 2 shock is 2−1.73=0.27. Behind a Mach 3 shock, it's 3−2.63=0.37.

The costs in engine power scale as kinetic energy, which varies as $v^2$. Thus, $(0.37)^2=0.137$ and $(0.27)^2=0.073$. The second one, at Mach 2, is only 53.3 percent of the first one at Mach 3. That may justify the use of a greater wedge angle. The criterion is to achieve the same air dragging speed of 0.37 at Mach 2 as at Mach 3 in XB-70. Then our kinetic energy loss can't exceed theirs.

From the graph in FIG. 16.5 of the textbook, we look for the deflection angle which will produce an exit Mach No. of 1.63 (then 2.0−1.63=0.37.) That angle is 11°—A worthwhile improvement from 7.5°. If the 11° was applied to nacelle 5 in FIG. 7, then it would be more than twice the XB-70's nacelle side taper of 5° measured from FIG. 3 in SAE Paper 650798. Our aircraft may come close, without using any added engine power, to compression lift in XB-70.

As a result, the preferred embodiment of an engine nacelle is not nacelles 2 and 8 in FIGS. 1 and 5, but nacelle 5 in FIGS. 2 and 7.

Fans in the Nacelles

In FIG. 5 it is seen that engine nacelle 8 is the same length as wing 7's chord at that span location. As a result, nacelles are 6½ feet longer than Concorde's nacelle. That creates an opportunity.

FIG. 7 shows nacelle 5 a replacement for nacelle 8, from overhead. In other words, looking down through wing 7 in FIG. 2. This exposes the interior contents. Two turbojet engines 77 and 78 receive their intake air from the front half of nacelle 5. Using the Concorde model, high-speed air at the upper left meets the fixed wedge, then adjustable ramp 70, creating shock waves 71. A normal shock complex shaped like a "W" follows. Subsonic diffusion in the expanding passage takes place until engine 77 is reached.

The nacelle layout differs from Concorde in that knife-edge 9 is vertical, not horizontal. Then nacelle 5 is just two airflow paths as in Concorde but back-to-back instead of side-by-side. The Figure is an imitation of the flow path and engine in FIG. 8 of SAE Paper 710756, also in bound SAE Transactions, 80:2507 (1971). But something has been added in FIG. 7.

Because of the curved flow paths hugging the inside of the nacelle side walls, a central island 75 is created. The volume is enough to house three fans 72, 73 and 74 which will double the air mass flow at takeoff to decrease the noise. Fans 72-74 will be driven by power taken from the front of the engines by driveshafts like 88 in FIG. 8. The low-pressure spool of 2-spool engine 78 would provide power.

FIG. 7 is for supersonic flight, and the apparatus for takeoff is ignored. The left side of FIG. 7 shows the flow events largely as they happen in Concorde. The right side of FIG. 7 shows the added events which concern the invention. External shock wave 54 is produced by wedge 53. Second shock wave 76 is made by the taper of nacelle 5's side wall (eight degrees compared to XB-70's five.) Wedge 53 angle of 7.5° compares to Concorde's fixed wedge angle of 7°. Spillage is ignored for the moment, as shock 54 is drawn grazing side wall 67 of nacelle 5, similar to XB-70 practice. Expansion wave 79 exists where the nacelle side wall turns back to axial. An expansion wave was accounted for at face 14a, FIG. 3a of U.S. Pat. No. 3,137,460 by the manufacturer of XB-70. Fans 72-74 are not turning.

Reduced Noise at Takeoff

FIG. 8 is for takeoff conditions. Intake air 80 approaches relatively slowly and fans 72-74 are turning. Their output will exhaust to the rear, creating thrust with relatively low noise. Fans 72-74 can be single-stage, producing a maximum pressure ratio of 1.7:1, which is low enough that only slightly enlarged low-pressure turbines 90 and 91 can turn the fans. Energy considerations were addressed in co-pending U.S. application Ser. No. 13/068,583. Exhaust nozzles like 92 will be opened wider than in FIG. 7. The greater pressure drop in turbines like 91 will help power fans 72-74. Lower jet 93 velocity from less pressure drop through exhaust nozzle 92 means less noise.

FIG. 8 shows the different airflow paths taken all around. Adjustable ramps 70 have closed, admitting air 80 to front fan 72. Clutch 89 has engaged, driveshaft 88 is turning pinion 87, and mainshaft 86 is powering fans 72-74. Wall portions of central island 75 have pivoted open to funnel some air to middle fan 73 and third fan 74. The fan output is collected by scrolls such as 81 and 83. The fans exhaust under the nacelle through chutes like 82 and 84. Engine 77 gets part of its intake airflow through open trapdoor 85 now that the swung-open wall portions of central island 75 have blocked part of the intake passage.

Excepting shock waves 54 and 76, plus the expansion at 79, all this fan material is covered in my co-pending U.S. application Ser. No. 13/068,583 ("Mass Flow Increase at Takeoff in Supersonic Airliner".) Existing research was cited for meeting FAR Part 36 noise regulations thusly. Simultaneously decreasing the exhaust velocity also reduces noise. It includes views of the fan discharge chutes which exhaust under the nacelle. It includes baffles and air dams not shown here but which are needed to implement the variable airflow paths.

The new material in the present application's FIGS. 7 and 8 is that the nacelle length increase of 6½ feet over Concorde's makes room for third fan 74. It is needed now because fans 72 and 73 have to be smaller than in U.S. application Ser. No. 13/068,583: The sides of nacelle 5 taper down to a narrower shape to create stronger shock wave 76.

Compression Lift Re-visited

It acts more on the rear of the aircraft than on the front, as seen in FIG. 5. The center of lift would move backward. Large elevator surface 48 is meant to counteract that. During subsonic flight, elevator 48 can be deflected downward, to produce lift at the rear. It can return to streamline during supersonic flight. The center of lift might not move much, reducing trim drag at cruise.

Any aerodynamic instabilities caused by compression lift at Mach 2 would have to be addressed vigorously in an aircraft carrying passengers. In fact, "a three-axis stability augmentation system" was installed in the XB-70. It succeeded enough for 1 hour 48 minutes at Mach 3 (JANE's, 1978-79, page 341.) In this age of computer-driven controls, any instability during flight could be detected and corrective action initiated at digital speeds, therefore safer.

In the XB-70, compression lift allowed a reduction in the wing's angle of attack from about 4° to a little over 2° (SAE Paper 660274, also SAE Transactions, 75:116 (1967)). That causes a reduction in drag-due-to-lift. From the same reference, page 117, operation was at altitudes where it was above about 96% of the Earth's atmosphere. That causes a reduction in skin-friction drag. Thus, several ways are identified in which compression lift improves the lift/drag ratio. Concorde cruised at 53,000 feet; XB-70 operated at 70,000 feet (JANE's, 1968-69, p. 341.) Our Concorde-sized aircraft with compression lift could cruise above 60,000 feet. The downside is that thinner air challenges the capabilities of flight controls. Among other measures, a large vertical tail for directional stability is expected. Composites would keep down the increase in weight and drag.

Landing Gear Safety

In FIG. 2, lower strut 17's offset from bogie 21 might make it swerve when landing: Wheel 20 suddenly accelerated to full speed will pull to that side. Motor-driven pre-rotation gear is already known.

The scope of the invention is found in the appended Claims.

The invention claimed is:

1. A supersonic aircraft including a body, two wings and two engine nacelles; each said nacelle extending below a said wing and located at part-span; said body including a fuselage and a keel; said keel disposed lengthwise below said fuselage;
a main landing gear including two struts and two wheel bogies; each said strut pivoted at one end in a said wing substantially inboard of a said nacelle; each said strut carrying at its other end a said wheel bogie; after takeoff, each said strut pivoting upward, lifting a said wheel bogie toward said keel; said keel having doors for entry of said wheel bogies, and having some volume for storing said wheel bogies; one said strut's pivoting including a forward component; the other said strut's pivoting including a backward component; said wheel bogies thereby stored one behind the other, partly or wholly in said keel; such tandem storage allowing said keel to be much narrower than said fuselage;
the exterior surface under said fuselage comprising two bottom strips not including said keel; each said bottom strip constituting a lengthwise area spanning the narrow width between said keel and the root portion of a said wing;
said wings positioned low, each one adjoining said fuselage at or near a said bottom strip; each said wing having a lower surface inboard of a said nacelle but outboard of a said bottom strip; a said lower surface together with a said bottom strip making a large expanse substantially spanning the area between a said nacelle and said keel;
a said nacelle having two air inlet openings at the front; said openings side-by-side and separated by a substantially vertical nose wedge; said nose wedge located ahead of several ramps each being part of the airflow ducts ultimately conveying intake air to several engines in said nacelle's rear; a said nacelle's front half having tapered sides angling narrower toward said openings;
when supersonic, said nose wedge or said tapered sides, or both, creating at least two oblique shocks trailing backward at some angle from opposite said sides of a said nacelle; first said oblique shock crossing under said large expanse; the air pressure rise behind said first oblique shock pushing up on some of said large expanse, thereby generating compression lift;
said keel extending farther back along said aircraft than said nose wedge; and said keel intercepting said first oblique shock, causing a reflected shock effect and increasing said compression lift.

2. The aircraft of claim 1 in which said fuselage is a wide-body fuselage, thereby creating wider said bottom strips, and increasing said large expanse for said air pressure rise to create lift.

3. The aircraft of claim 2 in which an elevator is fashioned out of the tail end of said wide-body fuselage, thereby obtaining pitch control with maximum leverage.

4. The aircraft of claim 1 in which the widest part of a said nacelle is at said nacelle's rear holding said engines; said two air inlet openings viewed from the front together outlining substantially a rectangle; said rectangle standing on end, rather than lying on its side; thus defining relatively narrow, upright said air inlet openings, in order to obtain large taper of said tapered sides extending forward from said widest part; said large taper making stronger said oblique shocks and increasing said compression lift.

5. The aircraft of claim 1 in which second said oblique shock travels outward toward a wingtip; a substantially stream-wise tip fin located at or near said wingtip; said tip fin being substantially vertical downward, intercepting said second oblique shock to create second reflected shock effect; said tip fin having substantially a triangle nose with its acute angle facing the airflow; said triangle nose located ahead of a said wing's leading edge; said acute angle constituting high sweepback which allows said triangle to penetrate said airflow with reduced formation of shock waves; said reduced formation of shock waves occurring upstream of the location of said second reflected shock effect, in order to reduce shock interference.

6. The aircraft of claim 1 in which said two air inlet openings are each rectangular in cross-section; said openings are bounded by an upper wall and two side walls; said upper wall being horizontal and shaped like a triangle with its apex to the front; said apex substantially coincident with said nose wedge; said upper wall covering said first oblique shock as it emerges from said nose wedge; said root portion of a said wing being highly swept back and joining said nacelle substantially at the junction of said upper wall and one said side wall; for the purpose of obtaining said intake air minimally, disturbed by shock waves from the leading edge of said root portion.

7. The aircraft of claim 1 in which said airflow ducts include two substantially separate airflow paths inside a said nacelle; said airflow paths being closely mirror images of each other and each one following a trajectory hugging the inside wall of one said side; each said trajectory being curved oppositely to the other, together defining central island void with available volume;

said available volume containing three axially-spaced fans driven by a central mainshaft; said fans not turning during supersonic flight; two driveshafts connected at their front ends to gearing able to turn said central mainshaft; said driveshafts connected at their back ends to two clutches driven from the front of said engines; said two clutches engaging for takeoff, thereby powering said fans and increasing the air mass flow; the increased said air mass flow conducive to producing thrust at relatively low noise;

said powering requiring greater pressure drop of the working fluid through the turbines of said engines, in order to produce more work; and said greater pressure drop subsequently causing decreased final pressure drop through said engines's exhaust nozzles, thus reducing the jet exhaust velocity for less noise.

* * * * *